United States Patent Office 3,708,499
Patented Jan. 2, 1973

3,708,499
RHODAMINE DYES WHICH ARE SPARINGLY SOLUBLE OR INSOLUBLE IN WATER
Franz Andree, Ludwigshafen, Hans Burkhardt, Limburgerhof, and Guenther Riedel, Mannheim, Germany, assignors to Badische Anilin- & Soda-Fabrik Aktiengesellschaft, Ludwigshafen (Rhine), Germany
No Drawing. Original application Aug. 14, 1968, Ser. No. 752,505. Divided and this application Nov. 20, 1970, Ser. No. 91,533
Int. Cl. C07d 7/42
U.S. Cl. 260—336               1 Claim

ABSTRACT OF THE DISCLOSURE

Rhodamine dyes having anions which render them insoluble in water and which make them especially useful in printing inks, ball point pen inks or, for example, transparent surface coatings.

---

This application is a divisional application of our application Ser. No. 752,505 filed Aug. 14, 1968, now abandoned.

Rhodamine dyes are outstandingly suitable for making printing inks (flexographic printing inks, glycol printing inks and the like), stamping inks, marking inks and ball point pen inks or for example for coloring transparent surface coatings, because of their high color strength and brilliance. However, since the conventional rhodamine dye chlorides or sulfates are easily soluble not only in alcohols and glycols but also in water, dyeings and prints prepared therewith generally have only low water fastness. For use in flexographic printing inks it is possible to add auxiliaries such as precipitants or resins which effect fixing so as to improve the water fastness. Examples of precipitants are high molecular weight organic acids. For many other purposes, for example in the production of ball point pen ink, glycol printing ink or transparent surface coatings, it is not possible, however, to add these auxiliaries so that the water fastness of the colorations is often very low.

Moreover the commercial salts of rhodamine dyes, i.e. the chlorides or sulfates, are in some cases only of moderate solubility in alcohols and glycols so that it is often impossible to prepared highly concentrated solutions which will remain stable even after prolonged storage. Another disadvantage of the chlorides and sulfates is their very marked corrosive effect on the metal parts of storage vessels and processing machines.

We have now found that rhodamine dyes, having the formula:

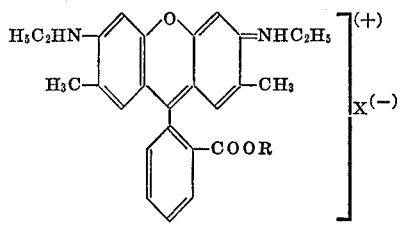

in which

R denotes methyl or ethyl and
$X^{(-)}$ denotes $H_5C_2SO_4^\ominus$ $H_3CSO_4^\ominus$, $H_2BO_3^{(-)}$ or $HCO_3^{(-)}$ are sparingly soluble or insoluble in water and only exhibit the said disadvantages to a slight extent or not at all.

It is surprising that the new rhodamine salts should be sparingly soluble or insoluble although the alkali metal salts having these anions, as well as the chlorides and sulfates, are readily soluble. Owing to their sparing solubility in water (which results in an improvement in the fastness to water of dyeings and prints and the like) and the simultaneous improvement in solubility in alcohols such as methanol, ethanol, propanol or benzyl alcohol, glycols such as ethylene glycol, diethylene glycol, triethylene glycol, propylene glycol or dipropylene glycol, glycol monoalkyl or dialkyl ethers or aryl ethers and polyglycol ethers, the new dyes are eminently suitable for the applications enumerated above. It is possible, however, although not necessary, to use compounds known as precipitants or fixing resins.

The dyes may be used also for the production of highly concentrated solutions which are stable in storage and which may be used for example as stock solutions for the preparation of printing inks, stamping inks or marking inks.

The new dye salts corrode metal parts much less than commercial dye salts do.

The rhodamine dyes are produced by known methods, for example by reaction of the dye bases with the appropriate acids or by double decomposition of dissolved rhodamine chlorides or sulfates with the alkali metal salts of the acids to which the anions belong.

The following examples, in which parts and percentages referred to are by weight, describe advantageous methods.

EXAMPLE 1

10 parts of 3,6-bis-(ethylamino)-2,7-dimethylfluoran is introduced into 50 parts of methanol and 12 parts of concentrated ethylsulfuric acid is added to the suspension. The whole is boiled for four to five hours under reflux, the excess of methanol is distilled off and the residue is taken up in 250 parts of hot water. The suspension is then suction filtered, washed free from acid with water, dried at 80° C. and 11.5 to 12 parts of sparingly water-soluble 3,6-bis-(ethylamino) - 2,7 - dimethyl-9-(2'-carbomethoxyphenyl)-xanthylium-ethosulfate (rhodamine 6 G methyl ester ethosulfate) is obtained.

11.7 to 12.2 parts of the sparingly water-soluble 3,6-bis-(ethylamino) - 2,7 - dimethyl-9-(2'-carboethoxyphenyl)-xanthylium-ethosulfate is obtained in the same way when ethanol is used instead of methanol.

When methylsulfuric acid is used for the esterification of 3,6-bis-(ethylamino)-2,7-dimethylfluoran, the rhodamine 6G methyl ester methosulfate is obtained after appropriate working up, or the corresponding salts of the ethyl esters when using ethanol. All these salts are sparingly water-soluble.

To prepare a red ball point ink which is very stable in storage and has good writing qualities, 20 parts of rhodamine 6G ethyl ester ethosulfate is dissolved at 90° C. in a solution of 25 parts of a hexanetriol phthalate in 55 parts of ethylene glycol monophenyl ether.

When rhodamine 6G methyl ester methosulfate is used instead of rhodamine 6G ethyl ester ethosulfate, a red ball point pen ink which has very good storage stability and good writing qualities is obtained in a similar way.

EXAMPLE 2

10 parts of rhodamine 6G ethyl ester ethosulfate prepared as described in Example 1 is introduced at room temperature into a mixture of 12.6 parts of ethylene glycol monophenyl ether and 2.4 parts of ethylene glycol. The whole is heated to 85° C. and the mixture is kept at this temperature for four to five hours, after which it is cooled to room temperature and suction filtered. 24.5 parts of a 40% solution of rhodamine 6G ethyl ester ethosulfate is obtained whose color strength as compared with commercial rhodamine 6G ethyl ester chloride (C.I. 45,160) (powder) is 33% according to spectrophotometric measurement. The highly concentrated rhodamine 6G solution thus prepared is distinguished by good storage stability and may be used, because no dust is formed, as a stock solution for the production of printing inks, stamping inks or marking inks.

EXAMPLE 3

10 parts of 3,6-bis-(ethylamino)-2,7-dimethylfluoran is introduced into 50 parts of methanol and then 10 parts of concentrated sulfuric acid is added to the suspension. The whole is boiled for four to five hours under reflux, the excess methanol is distilled off and the residue is taken up in 250 parts of hot water and filtered at about 90° C. from nonesterified bases, whereupon the solution is neutralized with sodium hydroxide.

5.2 parts of sodium bicarbonate is then added to it with good stirring. The dye is precipitated as the bicarbonate salt. It is filtered off, washed and dried at 70° C. 11.5 parts of rhodamine 6G methyl ester bicarbonate is obtained.

*Analysis.*—Found (percent): C, 66.7, 66.1; H, 6.5, 6.6; O, 21.8, 22.0; N, 5.2, 5.3; $CO_2$ 8.3, 7.9. Calculated as $C_{28}H_{30}N_2O_6$ (percent): C, 66.2; H, 6.1; O, 13.1; N, 5.7; $CO_2$, 9.0.

10 parts of the dye thus obtained is dissolved while heating at 80° to 90° C. in a mixture of 50 parts of diethylene glycol monobutyl ether, 18 parts of oleic acid, 15 parts of mineral oil and 17 parts of a colophony resin. This glycol printing ink containing mineral oil is distinguished by only a slight tendency to corrode and good storage stability and results in prints having good water fastness.

We claim:
1. The dye having the formula:

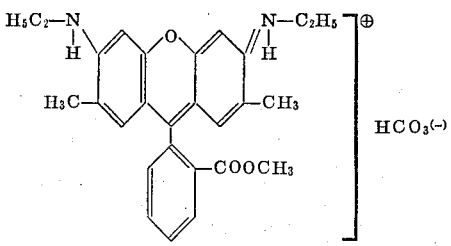

References Cited

UNITED STATES PATENTS

| 2,492,163 | 12/1949 | Locke | 260—208 |
| 2,727,825 | 12/1955 | Webber | 106—22 |
| 3,009,924 | 11/1961 | Schubert et al. | 260—396 |
| 3,157,677 | 11/1964 | Seibert et al. | 260—396 |

FOREIGN PATENTS

| 16,068 | 1899 | Great Britain | 260—336 |

OTHER REFERENCES

H. A. Lubs, Synthetic Dyes and Pigments (1955), pp. 296–8.

K. Venkataraman, Synthetic Dyes, vol. IV (1971), pp. 105–7.

NORMA S. MILESTONE, Primary Examiner

U.S. Cl. X.R.

106—22